United States Patent [19]

Dressler et al.

[11] 4,124,047
[45] Nov. 7, 1978

[54] ARRANGEMENT FOR HARVESTING TIMBER

[75] Inventors: Mirko Dressler; Vaclav Staud; Miroslav Skapa; Miroslav Stejskal, all of Krtiny, Czechoslovakia

[73] Assignee: Vyzkumny ustav Lesniho Hospodarstvi a myslivosti, Jiloviste-Strnady, Czechoslovakia

[21] Appl. No.: 732,119

[22] Filed: Oct. 13, 1976

[51] Int. Cl.$^2$ ............................................. A01G 23/08
[52] U.S. Cl. ................................. 144/3 D; 144/2 Z; 144/309 AC
[58] Field of Search ................. 144/2 Z, 3 D, 34 R, 144/34 E, 309 AC

[56] References Cited

U.S. PATENT DOCUMENTS

| 3,735,786 | 5/1973 | Vit ..................................... | 144/2 Z |
| 3,809,134 | 5/1974 | McCabe .............................. | 144/2 Z |
| 3,939,886 | 2/1976 | Tucek ................................. | 144/2 Z |

*Primary Examiner*—Othell M. Simpson
*Assistant Examiner*—W. D. Bray
*Attorney, Agent, or Firm*—Burgess, Ryan and Wayne

[57] ABSTRACT

An arrangement for harvesting trees consisting of a portable articulated grapple suspension and an independent cutting and delimbing unit comprising a main frame resting on the ground and a tree-engaging frame pivotally mounted to said main frame. The portable suspension is attached to a motor vehicle and employed to cut down trees and transport them to the independent cutting and delimbing unit. The portable suspension is moved to position the tree in contact with the tree-engaging frame, which pivots on the main frame to align itself with the tree. Thereafter, trimming arms and guide rollers of the tree-engaging frame engage the tree, while the tree is pulled through said frame by the motor vehicle, to delimb the tree. If desired, a cutting saw on the tree-engaging frame may be actuated to cut the tree into one or more sections.

5 Claims, 6 Drawing Figures

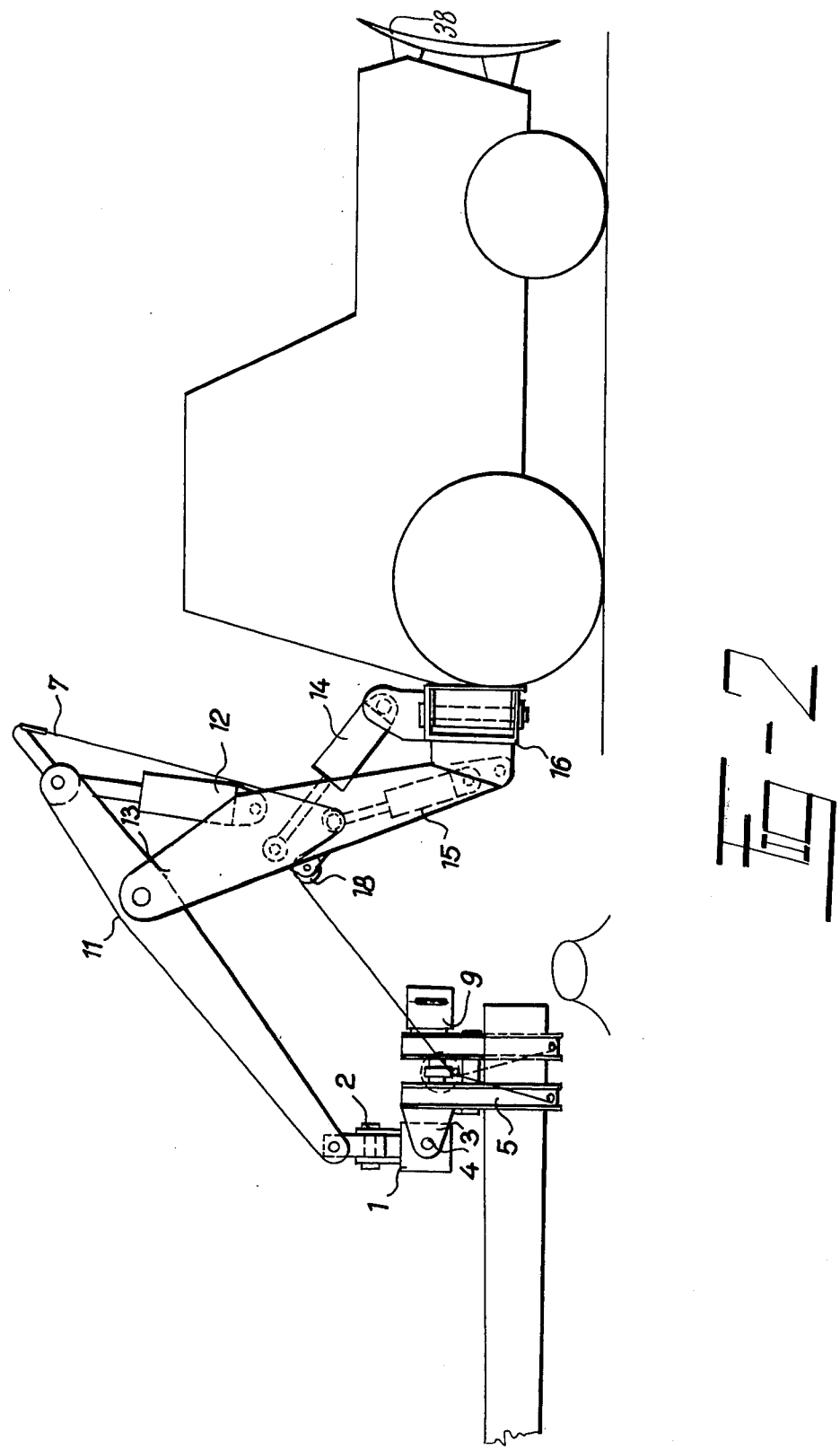

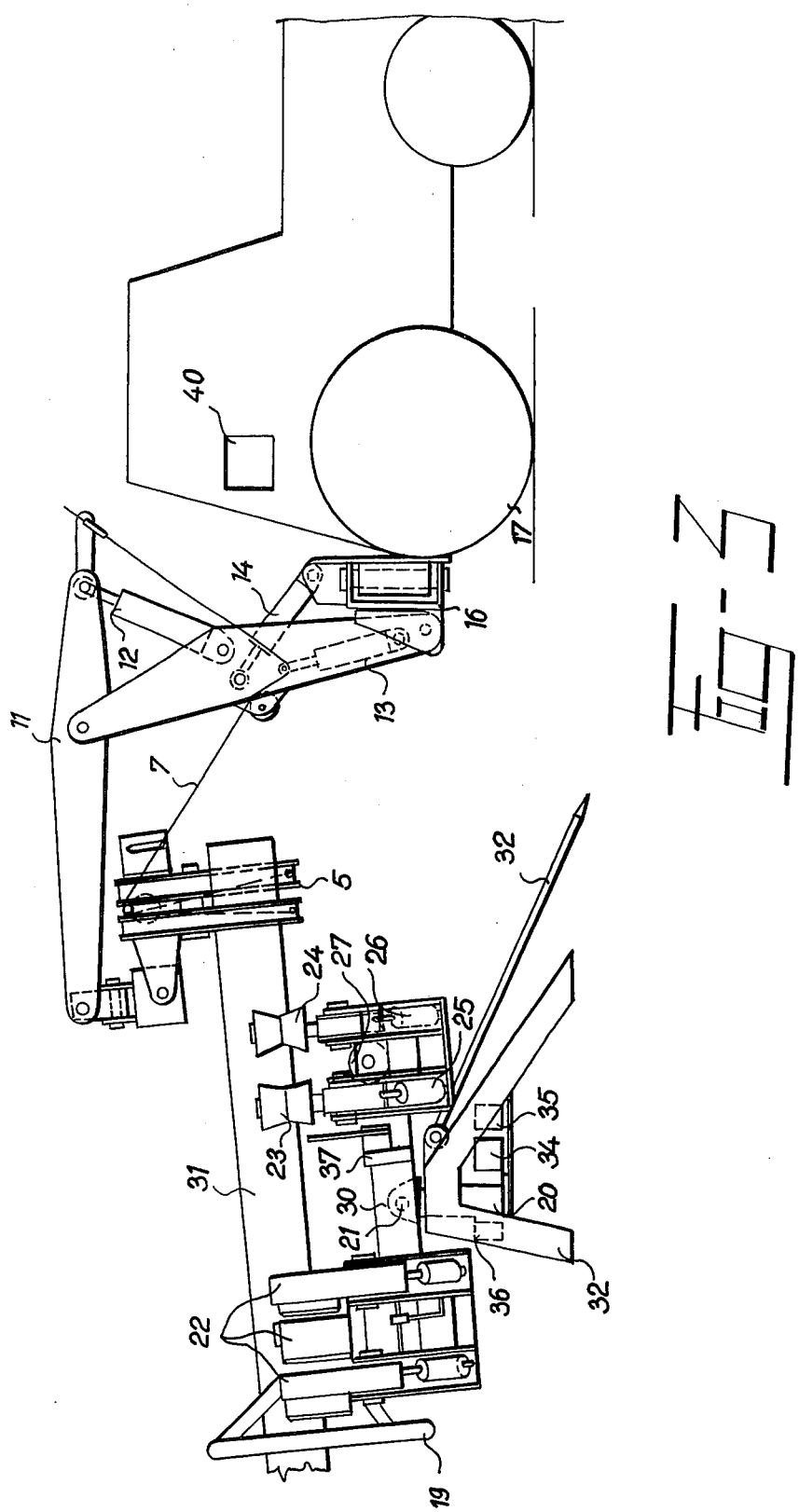

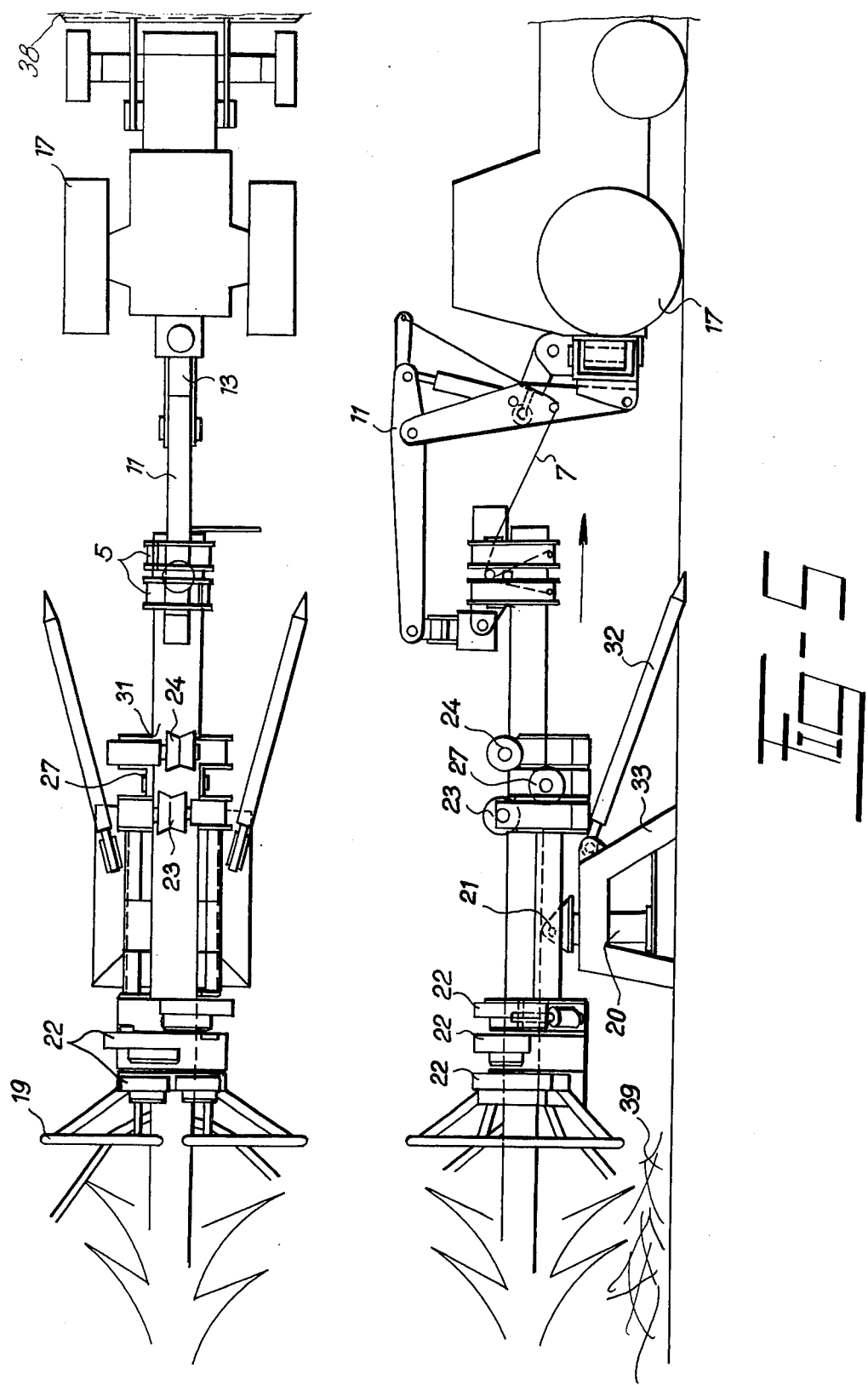

ARRANGEMENT FOR HARVESTING TIMBER

BACKGROUND OF THE INVENTION

The invention relates to an arrangement for the exploitation and concentration of timber. It is used for felling, removing, trimming, skidding, cutting and piling of wood to stacks.

Some of these partial operations can be of course omitted or their sequence changed.

The actually used technologies for this purpose comprise a number of operations, which are mainly characterized in that individual partial operations are performed by specialized machines. Recently more and more multioperation machines are used, which perform two or more partial operations. These machines are in most cases rather complicated, of large size and expensive. As the trees are introduced into these heavy arrangements and are supported thereby, they are suitable for trees of smaller dimensions only or for trees of reduced length.

Other arrangements of lighter design are also known that operate by means of simple rope systems, which however require more working hours. There is at present no similar arrangement, which would perform the exploitation and concentration of large trees common in forests which would operate without more attendants and which would work efficiently.

SUMMARY OF THE INVENTION

It is an object of this invention to provide a multioperation machine for this purpose, which could be easily transported to the working site and easily relocated at the working site and which would be capable of performing at least the major part of operations required for wood cutting and storing.

It is another object of this invention to provide an arrangement which could be operated by a single person and is capable of handling relatively heavy loads without manual work.

Further objects and advantages of this invention will be apparent from the following description of the invention.

The arrangement for exploitation and concentration of timber according to this invention comprises some traction means, for instance a tractor with a rake-blade and with a swinging grapple suspension consisting of a jib arm, an auxiliar arm, guiding means, holding rope, tightening device, an articulated suspension, a rotator on which by means of the grapple suspension grapple arms are mounted, controlled by the grapple cylinder, whereby the swinging grapple suspension is supported on the auxiliary arm by an arrangement not described in detail for a forced turning in a horizontal plane so that a tree clamped by the grapple arms can be introduced and subsequently by travel of the traction means, be pulled between trimming arms provided in front with a press frame. These trimming arms are supported by means of a pivotable frame on an independent stable main frame. The position of the tree on the pivotable frame is secured by a right guiding roller, by a left guiding roller and by a stable guiding roller. The pivotable frame is supported for turning on a horizontal bolt, connected to a vertical bolt mounted on the main frame. Strut means secure the anchoring of the main frame with the trimming arms.

The trimming arms are actuated by a cylinder of the trimming arms and right and left guiding rollers are pressed against the tree by cylinders of the right and left guiding roller. A parallel interconnection to an electrohydraulic distributor provided with a contact of a first auxiliary relay and with a contact of a second auxiliary relay secures a synchronized movement of both these cylinders, whereby the coil of the first auxiliary relay and the coil of the second auxiliary relay are connected in circuits provided with a first contact of a radio station and with a second contact of a radio station, connected in parallel with a first contactor and with a second contactor of a manual control.

A safety valve and a pressure storage device are connected to the pressure conduit leading to the cylinder actuating the trimming arms.

The grapple arms can be alternatively provided with a saw body and with a saw blade, not described in detail.

The pivotable frame can be also provided with a cutting saw of not described design. This cutting saw is brought into and out of engagement by a servomechanism, not described in, detail and brought to operation by a contact of a third auxiliary relay, the coil of which is in circuits of the third contact of the radio station and of the third contactor, connected in parallel.

A driving unit, for instances a combustion engine, a hydraulic pump and a radio receiver are also alternatively mounted on the main frame.

The main additional effect of the arrangement according to this invention with respect to the actual state of technology is that a single attendant can perform the felling, trimming, cutting, selection and tapering of wood by means of a simple, easily transportable arrangement, capable of operating also on larger inclinations and with trees of all current dimensions.

DESCRIPTION OF DRAWINGS

An exemplary embodiment of the invention is indicated in the attached drawings, where FIG. 2 shows in elevation the traction means with a swinging grapple suspension, in which a felled tree is clamped, FIG. 3 shows the situation prior to introduction of the tree between trimming arms, FIG. 5 shows in top view and elevation the trimming of trees by pulling by means of traction means.

DESCRIPTION OF PREFERRED EMBODIMENT

Figure 1:
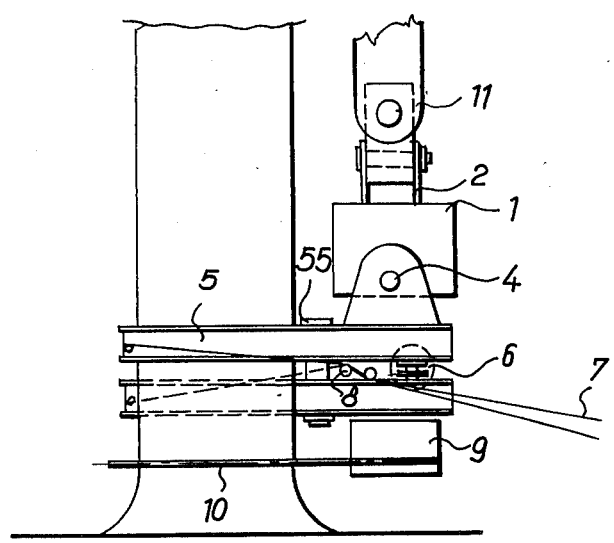
FIG. 1 shows in elevation details of grapple arms situated on a tree that should be felled.
Figure 4:
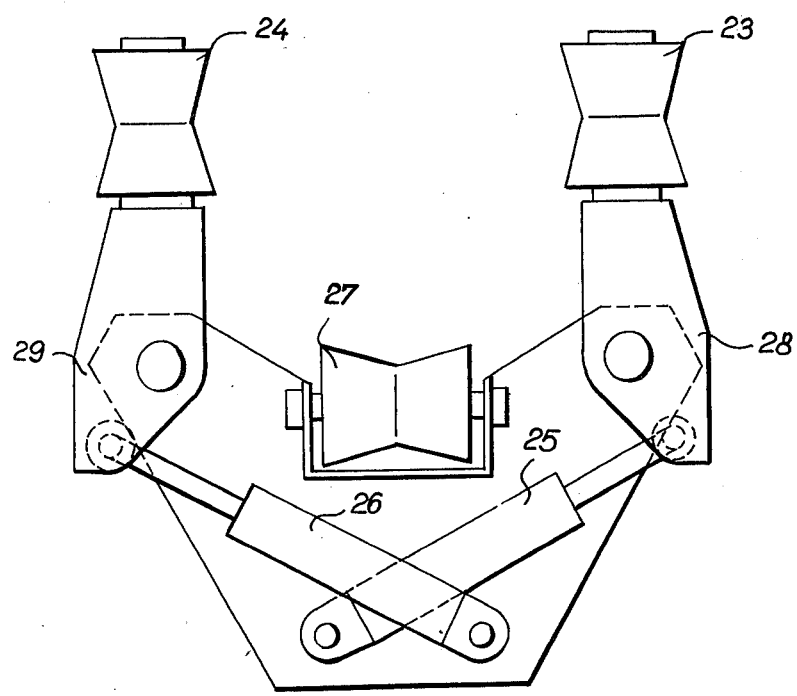
FIG. 4 shows in elevation details of an arrangement of guiding rollers.
Figure 6:
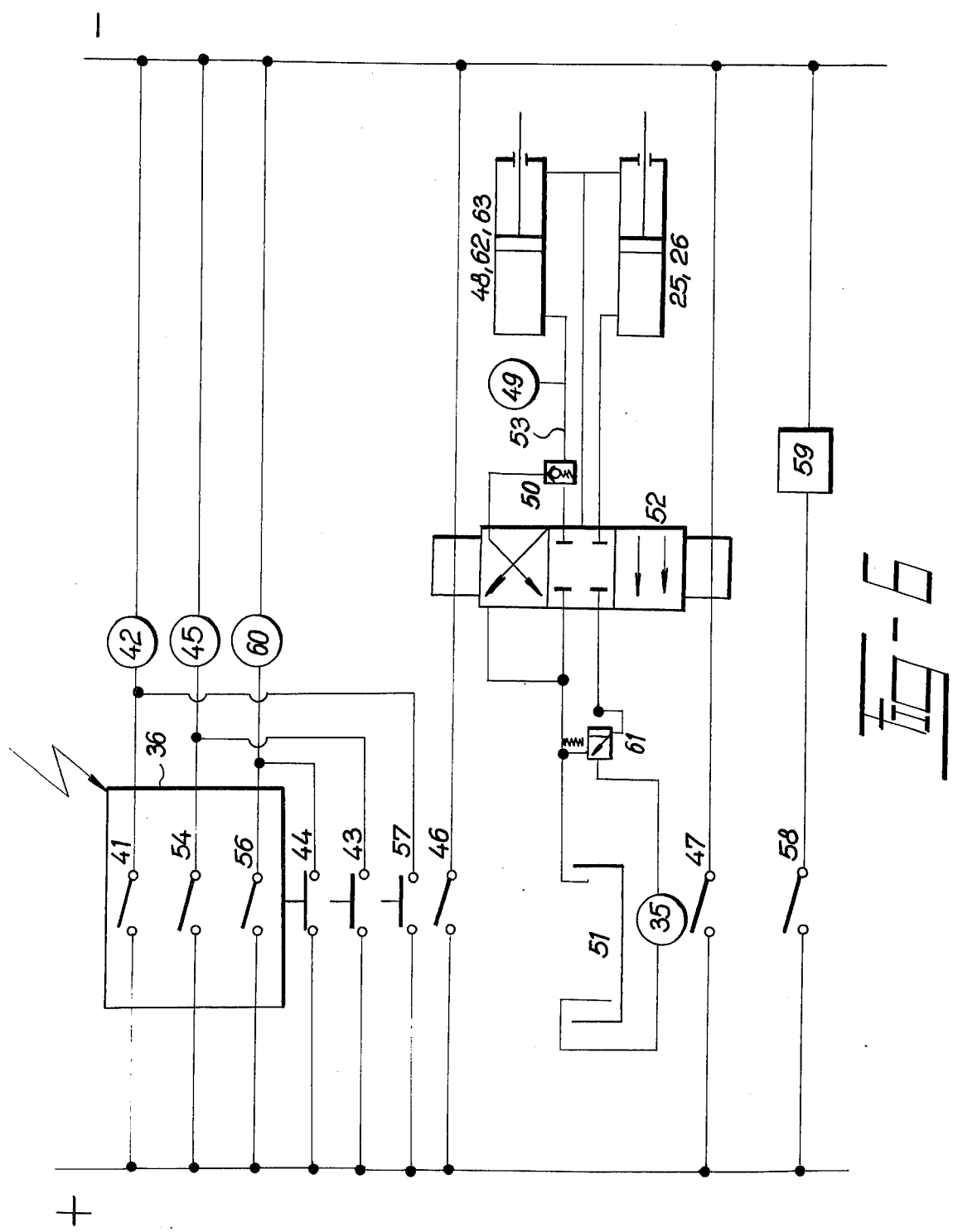
FIG. 6 shows the interconnection of electric and hydraulic circuits.

With reference particularly to FIGS. 2 to 5 a jib arm 13 is connected by means of suspension means 16 to some traction means such as wheels 17, in this case to a tractor. The suspension 16 allows the jib arm 13 to perform a lateral motion by means of a well known device (not described). The raising of the jib arm 13 is accomplished by a cylinder 14. An auxiliary arm 11 is swingingly supported on top of the jib arm 13 and is actuated by the cylinder 12. A holding rope 7 has its one end fixed on the free end of the auxiliary arm 11. This rope 7 is guided over a tensioning device in the form of a roller coupled to the hydraulic cylinder 15 and over a guiding roller 18 to guiding rollers 8, between which it passes to the ends of grapple arms 5.

An articulated suspension 2 is provided on the end of the auxiliary arm 11, on which suspension a rotator 1 is situated, supporting on a bolt 4 the grapple suspension 3. The grapple suspension 3 supports grapple arms 5, mounted swingably by well known means, not described. The closing of grapple arms 5 is accomplished by grapple cylinders 6. A saw body 9 and a saw blade 10 can be reciprocally connected to the grapple arms 5. Further parts of the arrangement are trimming arms 22, provided on both edges with cutting edges, which trimming arms 22 are mounted by means of a pivotable frame 30 on an independent main frame 33 adapted for stable seating on the ground and secured in position by strut means 32.

The trimming arms 22 are mounted on the front end of the pivotable frame 30 and a press frame 19 is fixed in front of them designed to rectify the inclination of branches for easier trimming. The trimming arms 22 are closed by a first cylinder 48, by a second cylinder 62 and by a third cylinder 63. A stable guiding roller 27 is mounted on the rear end of the pivotable frame 30 cooperating with a right guiding roller 23 and with a left guiding roller 24, controlled by a cylinder 25 of the right guiding roller and by a cylinder 26 of the left guiding roller by means of a lever 28 of the right guiding roller and by a lever 29 of the left guiding roller.

The pivotable frame 30 can be alternatively provided with a cutting saw 37. The cutting saw 37 is controlled by a servomechanism, not described, by a third auxiliary relay 58. The coil 60 of this third auxiliary relay 58 is in series with a third contact 56 of the radio receiver and with a third contactor 44. The pivotable frame 30 is connected by a horizontal bolt 21 with a vertical bolt 20 which is rotatably supported on the main frame 33. The main frame 33 is provided with strut means 32. A driving unit 34, a hydraulic pump 35 and a radio receiver 36 are mounted on the main frame 33, these elements can be however also alternatively mounted on some special supporting means which can also displace the main frame independently from the traction means 17 together with the trimming device. The radio receiver 36 is provided with a first contact 41 and with a second contact 54 of the radio receiver, in the circuits of which the coil 42 of the first auxiliary relay and the coil 45 of the second auxiliary relay are connected. To these circuits the circuits of the first contactor 43 and of the second contactor 57 respectively are connected in parallel. The contact 46 of the first auxiliary relay switches on the first circuit of the hydraulic distributor 52 and the contact of the second auxiliary relay 47 switches on the second circuit of the hydraulic distributor 52. The hydraulic distributor 52 is connected to a safety valve 61 of the distributor, to the hydraulic pump 35 and to the discharge tank 51 and via a pressure conduit 53 to a safety valve 30, to a pressure storage device 49, to a cylinder 48 of trimming arms, furthermore to the second and third cylinder 62 and 63 respectively of trimming arms, the cylinder 25 of the right guiding roller and the cylinder 26 of the left guiding roller.

A transmitting radio station 40 and a rake-blade 38 are mounted on the traction means 17.

The arrangement operates so that the traction means 17 comes close to a standing tree 31. By lateral turning of the jib arm 13 by not described means, by movement of the jib arm 13 in a vertical plane by means of the cylinder 14 of the jib arm, furthermore by movement of the auxiliary arm 11 by means of the cylinder 12 of the auxiliary arm and by movement of the rotator 1, the open grapple arms 5 are brought to the tree 31 at the place of the required cut. The rope 7 is thereby slackened. The slackening of the holding rope 7 causes the grapple arms 5, due to balancing of the device on the grapple suspension 3, to constantly assume a horizontal position. Due to the action of the grapple cylinder 6 the grapple arms 5 close in on the tree 31 and the saw blade 10 is brought subsequently in its cutting position. After having accomplished the cutting operation the saw blade 10 returns immediately into its original position. When the cutting is ending, and after its termination, the tree is, by deviation of the jib arm 13 and of the auxiliary arm 11, caused to fall in the required direction.

If due to a calamity uprooted trees are treated, it is possible to deviate the grapple arms 5, which automatically take a horizontal position, to the required position by means of the holding rope 7 tightened by a tensioning device 15. The placing of grapple arms 5 on fallen or partly laying trees 31 is quite the same as in the above described case.

When cutting uprooted trees, a raising of the jib arm 13 or a movement of the auxiliary arm 11 can be used for releasing the stress on the saw blade 10 in the course of cutting.

Alternatively it is also possible to grip by the grapple arms 5 trees 31 felled by other means.

The tree is thereafter by the travel of the traction means 17 pulled toward the main frame 33 firmly anchored by the strut 32. By deviation of the jib arm 13 and by moving by the traction means 17 around the main frame 33 the tree 31 is placed between open trimming arms 22, the right guiding roller 23 and the left guiding roller 24. By further movement of the traction means 17 along a track of the shape of a double arc and by deviation of the jib arm 13 toward the axis of the traction means 17 the required coaxial relationship of the tree 31, of the traction means 17 and of the pivotable frame 30 is accomplished. Smaller deviations are compensated in that the pivotable frame 30 is rotatably mounted on a bolt 20 of the main frame 33. The tree 31 is placed by the auxiliary arm 11 to an advantageous lower position, the holding rope 7 is by means of the tensioning device 15 stretched, obtaining thereby a more stable position of the traction means 17 required by substantial resistances in the course of trimming. The attendant transmits over the transmitting station 40 a signal, which is evaluated by the radio receiver 36, closing the first contact 41 of the radio station and causing current to flow in the coil 42 of the first auxiliary relay. The contact 46 of the first auxiliary relay closes the circuit of the hydraulic distributor 52 which allows passage of oil under pressure from the hydraulic pump 35 over the safety valve 61 of the distributor into the pressure conduit 53, connected to the cylinder 48 of trimming arms and to the second and third cylinder 62 and 63 respectively. The cylinder 48 of the trimming arms, the second and third cylinder 62, 63 press the trimming arms 22 against the tree.

The cylinder 26 of the left guiding roller and the cylinder 25 of the right guiding roller connected in parallel press the left guiding roller 23 and the right guiding roller 24 against the tree 31.

Thus the tree 31 is clamped at two places and the pivotable frame 30 takes a position parallel with the tree 31. By pulling the tree 31 with the traction means 17, the branches of the tree 31 are trimmed by the trimming arms 22. The press frame 19 rectifies thereby the branches and facilitates the trimming. The accumulator 49 and the safety valve 50 compensate pressure fluctuations in the pressure conduit in the course of trimming.

After trimming of the main part of the tree 31 a signal is transmitted via the transmitting radio station 40, which signal is evaluated by the radio receiver 36, causing its third contact 56 to be closed, which contact closes the circuit of the third auxiliary relay 60. A contact 58 of the third auxiliary relay closes the circuit of the servomechanism 59 of any suitable design, which puts into operation the cutting saw 37. The cutting saw 37 cuts the end of the tree or possibly makes cuts on other places, enabling also a cutting of the tree to parts.

After the tree has been trimmed, the attendant transmits an order via the transmitting radio station 40. The radio receiver evaluates the signal and closes the second contact 54 of the radio receiver, which in turn energizes the circuit 45 of the second auxiliary relay. A contact 47 of the second auxiliary relay closes the circuit of the hydraulic distributor 52, which passes pressure medium into the first cylinder 48 of the trimming arms and into the second and third cylinder 62 and 63 respectively of the trimming arms so that the trimming arms 22 are opened and passes also pressure medium into the cylinder 25 of the right guiding roller and into the cylinder 26 of the left guiding roller so that the left guiding roller 24 and the right guiding roller 23 are displaced to the opened position. The trimmed tree 31 or the cut parts are dragged away by the traction means 17 to the lumberyard and stacked by the blade 38. It is possible to collect two or more trimmed trees 31 and skid them together to the lumberyard. When returning to the clearing, the traction means 17 puts by means of the blade 38 the brushwood collected in front of the main frame 33 to the side and the whole operation can be repeated.

The driving unit 34, the hydraulic pump 35 and the radio receiver 36 are located on the main frame 33.

The main frame 33 is supported by the strut means 32 so as to prevent its turning over at high pressures in the course of trimming.

We claim:

1. An arrangement for harvesting trees utilizing a motor vehicle, said arrangement comprising a portable articulated grapple suspension connected to a motor vehicle and an independent cutting and delimbing unit comprising a main frame and a tree engaging frame pivotally mounted on said main frame, said portable articulated grapple suspension comprising a jib arm having an upper end and a lower end, means for connecting said lower end to a motor vehicle, said jib arm being rotatable about a horizontal axis and a vertical axis, and an auxiliary arm pivotally connected to the upper end of the jib arm and rotatable in a vertical plane, means for controlling the positions of the jib and auxiliary arms, articulated grapple means comprising a grapple support suspended on one end of the auxiliary arm and rotatable about a horizontal axis and a vertical axis, at least two grapple arms carried by the grapple support, means for opening and closing the grapple arms in response to a first control signal, a holding rope means for establishing the angular position of the grapple support with respect to the auxiliary arm, and means on the jib arms for tensioning said holding rope, said main frame being adapted to be placed in a stable position on the ground, and including strut means for securing the same in said stable position, said tree-engaging frame being pivotally mounted on said main frame for rotation about a vertical axis and a horizontal axis, said tree-engaging frame including trimming means responsive to a second control signal for trimming branches from a tree, said trimming means including movable trimming arms, at least two movable guide rollers for supporting a tree on said tree engaging frame, said rollers being movable in response to a third control signal, means adjacent the trimming arms for altering the position of branches of a tree to be harvested, and means for generating said first, second and third control signals, so that (i) when said tree is brought into operative engagement with said tree-engaging frame by said articulated grapple suspension, said frame pivots to align itself with the tree, said guide rollers move into engagement with the tree, and said motor vehicle may pull said tree through said tree-engaging frame to cause said trimming means to delimb the tree.

2. Arrangement as claimed in claim 1, further comprising a saw blade on the grapple support.

3. Arrangement as in claim 1, comprising a rake blade, means for mounting said blade on said motor vehicle, and hydraulic control means for positioning the rake blade and the grapple suspension.

4. Arrangement as claimed in claim 1, comprising a radio control transmitter on said motor vehicle, a radio control receiver on the main frame for generating control signals in response to radio signals from said transmitter, and a hydraulic control means responsive to said control signals for operating the means for controlling the position of the trimming arms, the means for controlling the position of the rollers and the tree branch position altering means.

5. Arrangement as claimed in claim 1, further comprising hydraulic control means for controlling the position of the trimming arms, the position of the rollers and the tree branch position altering means, and comprising a hydraulic accumulator for compensation of pressure variations in the hydraulic control means for the trimming arms.

* * * * *

UNITED STATES PATENT OFFICE
CERTIFICATE OF CORRECTION

Patent No. 4,124,047                    Dated November 7, 1978

Inventor(s) Mirko Dressler, et al

It is certified that error appears in the above-identified patent and that said Letters Patent are hereby corrected as shown below:

Column 1, line 8: "of wood to stacks" should be --wood in stacks--.

Column 4, line 19: "laying" should be --fallen--.

Signed and Sealed this

Twenty-second Day of May 1979

[SEAL]

Attest:

RUTH C. MASON
Attesting Officer

DONALD W. BANNER
Commissioner of Patents and Trademark